United States Patent [19]
Atkinson

[11] 3,916,639
[45] Nov. 4, 1975

[54] AUTOMOBILE COOLER AND RECEPTACLE

[76] Inventor: Richard K. Atkinson, 175 Karen Drive, West Columbia, S.C. 29169

[22] Filed: July 12, 1974

[21] Appl. No.: 488,016

[52] U.S. Cl. ............... 62/239; 62/244; 62/337; 62/331; 165/41
[51] Int. Cl.² .......................................... B60H 3/04
[58] Field of Search ............. 62/244, 331, 337, 239; 165/41

[56] References Cited
UNITED STATES PATENTS

| | | | |
|---|---|---|---|
| 2,902,838 | 9/1959 | Nichols | 62/337 |
| 3,043,116 | 7/1962 | Fuller | 62/244 |
| 3,410,337 | 11/1968 | Priest | 62/337 |
| 3,505,830 | 4/1970 | Koerner | 62/244 |
| 3,757,851 | 9/1973 | Marble | 165/41 |

*Primary Examiner*—William J. Wye

[57] ABSTRACT

An automobile accessory comprised of a chest of insulated material having an upper end closed by a removable lid and four adjustable legs engageable with the front floorboard of an automobile to support the chest over the transmission hump. The chest has an inclined forward wall so as to fit partly beneath the vehicle dashboard. A thermos bottle having a horizontal spigot may be positioned within the chest with the spigot extending through the chest wall for ready access. The lid is provided with a plurality of recesses for accommodating beverage containers, adjustable damper means having an operating knob which also serves as the lid handle, and a port arranged for detachable connection by means of a flexible conduit to an air conditioning outlet in the dashboard for introducing refrigerated air into the chest. The unit is adapted to serve as an ice chest or air cooler, a trash receptacle or storage compartment, a tray for beverage containers, and a holder for supporting a thermos bottle in position for immediate use.

10 Claims, 6 Drawing Figures

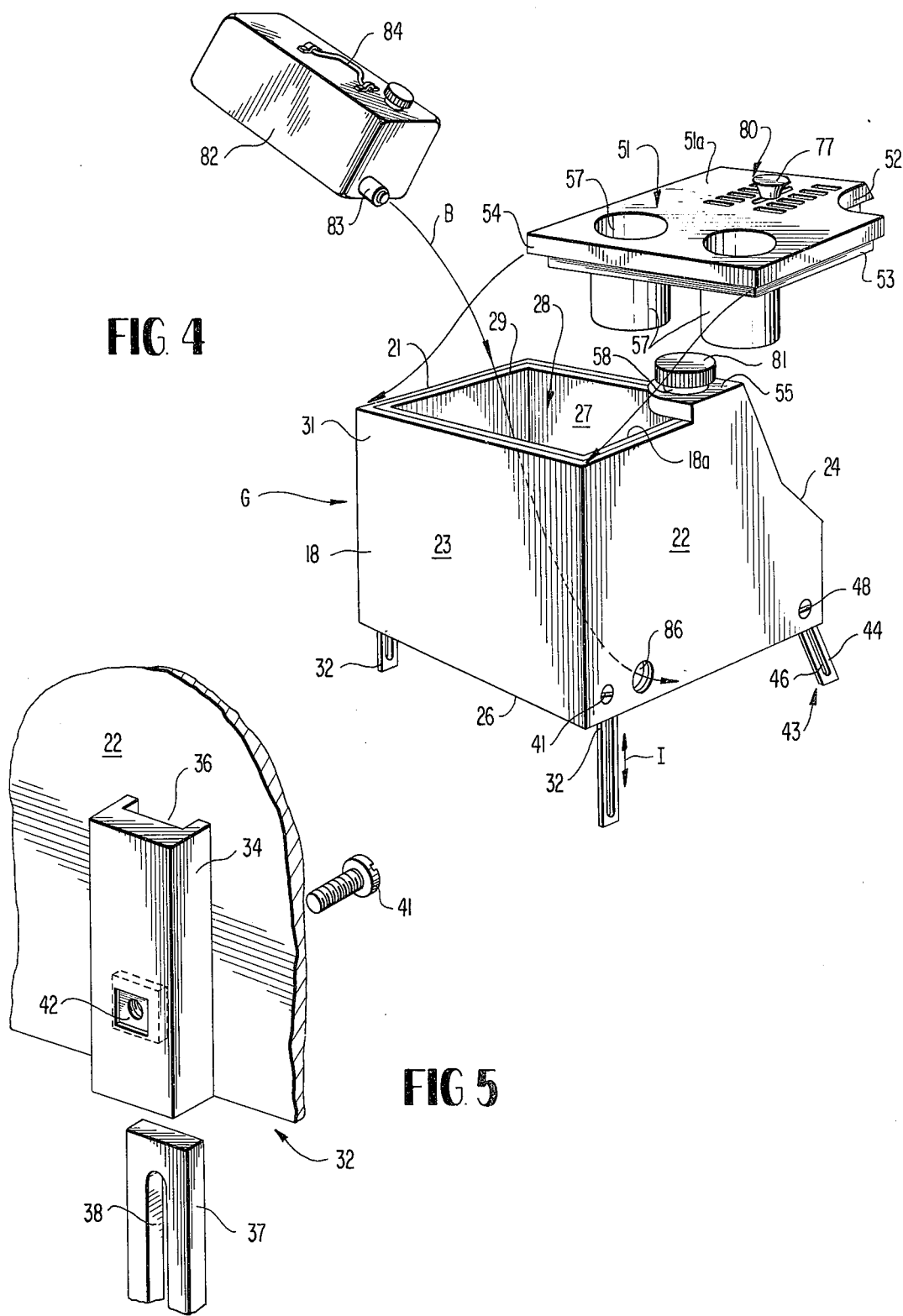

AUTOMOBILE COOLER AND RECEPTACLE

BACKGROUND OF THE INVENTION

The present invention is related to an accessory which may be installed in an automobile for providing cooled food and drink to the driver and passengers. Alternatively, the accessory may serve as a trash receptacle or an auxiliary storage compartment. The invention is also useful as a holder or tray for beverage containers and comestibles for consumption by the driver and passengers.

In the typical passenger automobile in use today, it is a common practice to carry food and drink for the driver and passengers, either for consumption during a trip or at an outing such as a picnic or the like. Receptacles or chests of insulated material, such as foam plastic or the like, are widely used and usually employ ice as the cooling medium to maintain the food and drink in a refrigerated condition for ultimate consumption. It is well known that such ice chests or receptacles are quite bulky and unwieldy and, consequently, are stored in a relatively inaccessible part of the automobile such as the trunk so as to avoid interference with passenger movement and comfort and to avoid using the limited space available in the passenger area.

It has also been proposed in the past to utilize refrigerated air from the air conditioning unit of an automobile for cooling foodstuffs, beverages and the like within insulated chests. This has been accomplished by the provision of a conduit or hose connecting the chest to an air conditioning outlet in the automobile, refrigerated air being conducted through the conduit into the interior of the chest. Such prior art arrangements require storage of the chest or receptacle on either the seats or floorboards of the passenger compartment, regardless of whether the chest is positioned within the front of the automobile interior or in the rear by extending the air hose. Therefore, considerable passenger space is occupied by such chests and their connecting hoses and other accessories, greatly adding to passenger inconvenience.

In another aspect of present day automobile operation, there is frequently a need for disposal of trash and other litter which accumulates in considerable quantity during typical operation of a passenger vehicle. As is well known, the discarding of such trash and litter outside the automobile is prohibited by law. In order to avoid cluttering of the automobile interior, a common practice is to provide bags, boxes or the like within the passenger compartment, all of which use additional passenger space. Present day litter bags designed for use within other interior areas of an automobile do not have the necessary capacity for accommodating the typical quantity of litter generated when roadside collection containers are sparse or cannot be used conveniently.

Accompanying the consumption of food and beverages within the interior of passenger automobiles is the problem of holding beverage containers, particularly for the driver who is frequently hard pressed to avoid spillage when putting down a container during manipulation of the vehicle. Although there are presently available drink trays, litter boxes and even insulated containers which utilize the transmission hump of an automobile for support, such present day devices have many limitations and are generally designed for a single purpose only such as to hold beverage glasses. These disadvantages include interference with comfortable seating of passengers, inconvenience of beverage container holders to both driver and passengers, and inadequate capacity of both litter receptacles and thermos holders. Furthermore, the storage spaces presently provided in the automobile interior, such as the glove compartment, are often inadequate in size and dead space which would otherwise be available for storage has not been so utilized. All of these limitations and disadvantages have been overcome by the present invention.

SUMMARY OF THE INVENTION

The invention disclosed herein is directed to a novel combination cooler and receptacle for use in an automobile having an air conditioning unit with an outlet in the dashboard and a centrally located transmission hump on the front floorboard underlying the dashboard. The invention includes a container of insulating material having a pair of side walls, front and rear walls, a bottom wall and an open upper end with the walls defining an interior which is accessible through the open end. A substantially rectangular closure or lid of insulating material is arranged to fit snugly in closing relationship with the container open end, and vertically adjustable leg members are provided near the bottom corners of the container for centering and supporting it in overlying relationship with the transmission hump. When in place, the front wall of the container is adjacent to the front seat for ready access and the rear wall is directed toward the front end of the vehicle, the rear wall being angularly disposed to permit the container to be at least partially positioned beneath the dashboard. The container lid is provided with at least one recess in its upper surface for accommodating a beverage container such as a drinking glass and with an opening for connection to one end of a flexible conduit. The other end of the conduit is arranged to be detachably connected to an air conditioning outlet in the dashboard for introducing refrigerated air into the container interior. Damper means, including an adjustable air outlet, is also provided on the lid for regulating the flow of cool air through the container.

A primary object of the invention is therefore to provide a new and novel combination cooler and receptacle which permits foodstuffs, beverages and the like to be stored conveniently in a cooled condition within the passenger compartment of a vehicle such as an automobile.

Another object of the inventtion is to provide a new and novel combination cooler and receptacle which can be easily positioned within the interior of an automobile so as to be readily accessible to the driver and passengers without interfering in any way with passenger seating and comfort.

A further object of the invention is to provide a new and novel combination cooler and receptacle for an automobile which may be used interchangeably for cooling foodstuffs, liquids and the like; for collecting litter, trash and the like; or for providing additional interior storage space for usable items.

A still further object of the invention is to provide a new and novel combination cooler and receptacle for an automobile which provides for the cooling of foodstuffs, beverages, and the like through either the use of ice or refrigerated air from the automobile air conditioning unit, or both.

Still another object of the invention is to provide a new and novel combination cooler and receptacle for an automobile which, in addition to the functional uses of cooling, trash collection, and storage, provides a convenient, easily accessible and secure tray or holder for beverage containers such as drinking glasses and for comestibles such as sandwiches or the like.

This invention further contemplates the provision of a new and novel combination cooler and receptacle for an automobile which is easy and inexpensive to construct, which is composed of a minimum of parts, which is readily adjustable in height for convenient access within the automobile interior, and which has a wide variety of functional uses such as a cooler for comestibles and potables, as a storage compartment for general articles and as a holder or tray for drinks, food and other items.

A still further object of the invention is to provide a new and novel combination cooler and receptacle for an automobile which may be used as a storage receptacle for litter or any other items while at the same time providing for the dispensing of a refrigerated beverage from an internally stored container accessible to the driver and passengers without removal of the receptacle lid.

In addition to the numerous advantages apparent from the following discussion, the present invention has the further advantages of simplicity, ruggedness, durability and ease and economy of construction and manufacture. The container incorporated in the invention may be manufactured using well-known foam plastic molding processes and the relatively few moving parts associated with the container, such as the legs and air damping device, can be easily attached thereto. The air conditioning conduit may be of any suitable construction and is readily adaptable for attachment to a wide variety of air conditioning outlets in automobile dashboards. The unit is also readily adaptable for placement in a wide variety of sizes and types of automobiles. The exact nature of the invention as well as other objects and advantages thereof will be readily apparent from the annexed drawings and the following specific description of the preferred embodiments of the invention.

DESCRIPTION OF THE DRAWINGS

For a better understanding of the present invention, reference is made to the accompanying drawings in which:

FIG. 4 is a perspective view of the invention illustrating placement of an auxiliary component;

FIG. 5 is an enlarged fragmentary perspective view showing construction details of a receptacle leg member with the parts in a disassembled condition.

DETAILED DESCRIPTION OF PREFERRED EMBODIMENT

Figure 1:
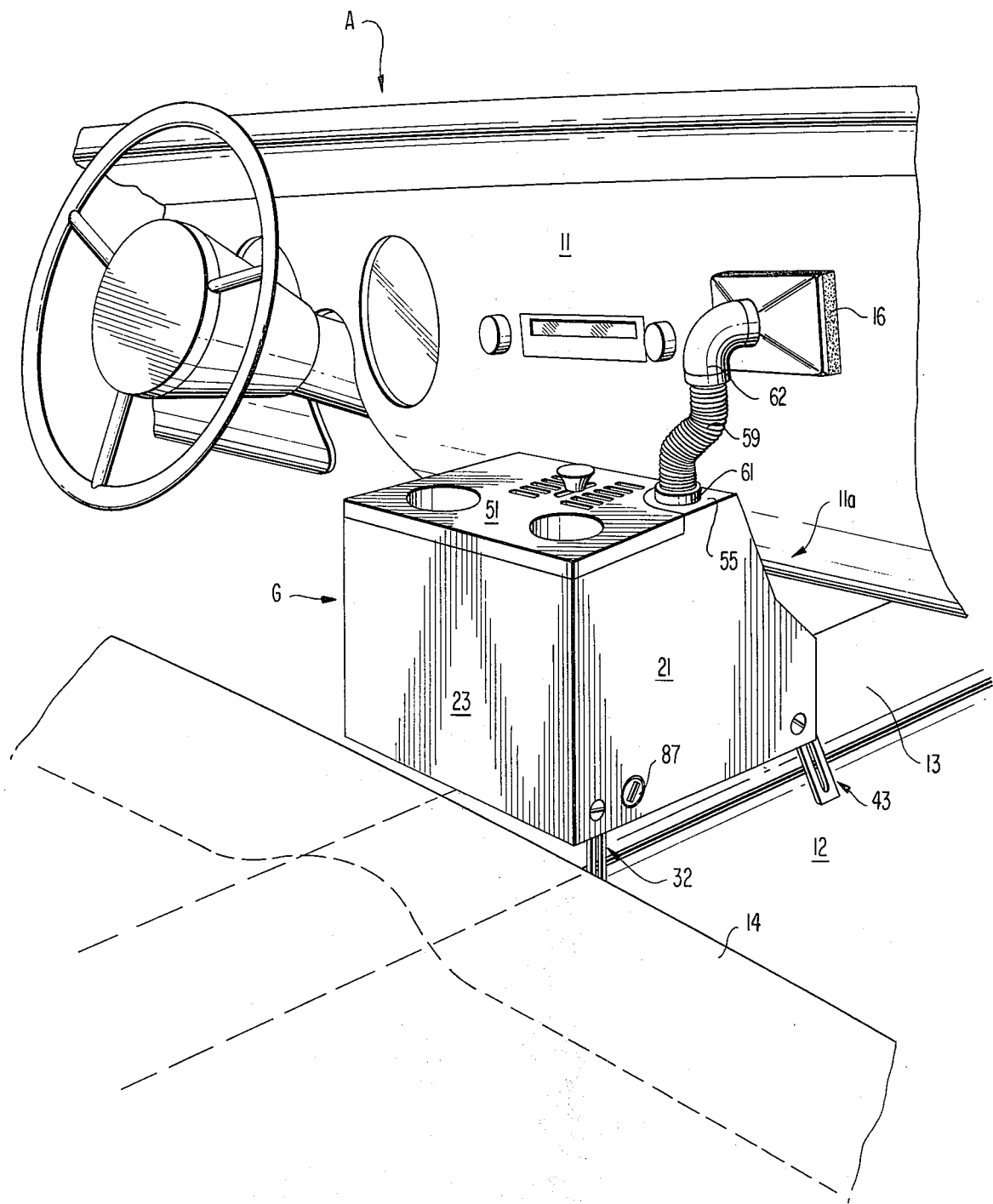
FIG. 1 is a perspective view of a portion of the interior of a conventional automobile showing the invention in the installed position.

As generally illustrative of the invention and with reference to FIG. 1, there is shown a combination cooler and receptacle constructed in accordance with the invention and designated generally by the letter G. The combination cooler and receptacle G is in its installed position within the interior of a conventional automobile, designated generally by the letter A. The view of FIG. 1 is representative of the front seat area of the interior of such an automobile. As is well known, the automobile A includes a dashboard 11, a front floorboard 12 extending well beneath the dashboard 11 and having a centrally disposed transmission hump 13, a front passenger seat 14, and an air conditioning unit having a dashboard outlet 16 for the introduction of air conditioned or refrigerated air into the automobile interior.

As best illustrated in FIG. 4, the combination cooler and receptacle G includes a chest or container 18, preferably molded from insulating material such as plastic or the like, having a pair of side walls 21 and 22, a front wall 23, a rear wall 24 and a bottom wall 26, all defining an interior 27 for the storage of various items such as ice and foodstuffs, litter and trash, or other storable articles. The container 18 is provided with an open upper end 28 through which such items are introduced into the interior 27. Preferably, the container 18 is of multi-layer construction with an inner layer 29 of foam plastic, such as styrofoam or the like and an outer layer or coating 31 of rigid or semiflexible plastic material.

The rear wall 24 of the container 18 is angularly disposed with inclined faces 24a and 24b as shown best in FIGS. 1 and 2 to permit the lower portion of the container to be positioned in underlying relationship below the inclined undersurface 11a of the dashboard 11. Thus, the front to rear depth of the bottom 26 is substantially greater than the depth of the upper open end 28. In the preferred embodiment, the container is approximately 11 inches wide, approximately 9 inches high, and approximately 12 inches deep at the bottom and approximately 6 inches deep at the top, giving a bottom to top depth ratio of 2 to 1.

Vertically adjustable leg means are provided for supporting the container 18 in overlying relationship above the transmission hump 13 as best shown in FIG. 1. More specifically, a pair of substantially identical front leg members 32 are each arranged on one of the side walls 21 and 22 for vertically adjustable sliding movement adjacent to the front wall 23. As further illustrated in FIG. 5, the leg members 32 include a stationary guide member 34 suitably mounted on the inside of the rigid portion of the associated container side wall. The guide member 34 has a longitudinally extending groove 36 for slidably accommodating an extensible leg 37 having a central, longitudinally extending groove 38. The lower end of leg 37 supportingly engages the automobile floorboard 12 as shown in FIG. 1.

The legs 37 are thus mounted for vertically adjusting movement in the direction of the double arrow I of FIG. 4 and are arranged to be secured in a selected vertical position by a releasable clamping means such as screw 41. The screw 41 extends through a suitable opening in the container side wall 22 and through the leg groove 38 into a nut 42 suitably positioned within the guide member 34 for clamping the leg 37 in position.

The adjustable leg means for the container 18 also includes a pair of substantially identical rear leg members 43—43 which are of substantially the same construction as the front leg members 32—32. However, the rear leg member 43, which includes extensible leg 44 having a slot 46 and guide member 47, is angularly disposed so as to generally parallel the angular disposition of the rear wall face 24b as shown in FIG. 2. Releasable clamping means 48, similar to front screw 41 and nut 42, are provided for clamping the rear legs 44—44 in the selected position.

The combination cooler and receptacle G includes removable closure means preferably formed from the same insulating material as chest 18. The closure means is detachably positioned in snug-fitting, closing relationship with the container open end 28 as shown in FIG. 1. More specifically, the closure means comprises a substantially rectangular lid member 51 having an outer surface 51a of rigid type plastic and an inner marginal edge 53 of foam type plastic arranged to snugly interfit within the marginal edge portion 18a adjacent to the open upper end 28 of the container.

In order to provide a drink tray or holder in the installed position of FIG. 1, the lid 51 has at least one and preferably a pair of downwardly depending recesses 57—57 formed integrally therein and disposed in spaced-apart relationship adjacent to the front portion 54 of the lid member. The recesses 57 provide receptacles for accommodating drinking glasses, cups, bottles, cans and other hand-sized beverage vessels and holds such vessels at a height and location readily accessible to the automobile driver and passengers. Also, the upper portion of surface 51a of the lid 51 serves as a convenient depository for foodstuffs and the like during consumption by the driver or passengers.

A concave indentation 52 is provided at the right rear corner of the lid 51 as viewed in FIG. 4 and is contoured to fit snugly in abutting relationship with a shelf 55 having an opening 58. Preferably, shelf 55 is an integral part of side wall 22 and rear wall 24, but has the thickness of lid surface 51a and overlies marginal edge portion 18a and interior 27 so as to form a continuation of the closure structure when lid 51 is in place. Opening 58 is internally threaded for connection to the discharge end of an air hose or conduit 59 through which refrigerated air is conveyed to the container from a conventional air conditioner. Although shelf 55 can be eliminated by making the air inlet an integral part of lid 51, the preferred structure has the advantage of allowing access to the receptacle without disturbing the cool air conduit.

The hose or conduit 59 is of a flexible construction and of sufficient length to reach a convenient outlet on the dashboard. A length of approximately 15 inches has proven satisfactory. The discharge end 61 of the hose is preferably threaded externally so as to engage corresponding internal threads within the lide opening 58. Means are provided on the other hose end 62 for connecting the hose to an air conditioning outlet 16 as illustrated in FIG. 1.

Figure 6:
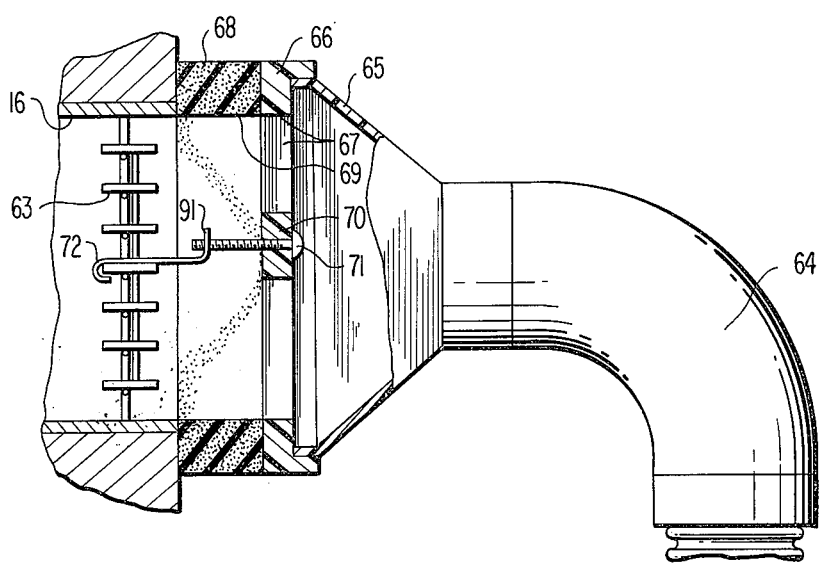
FIG. 6 is an enlarged fragmentary sectional view showing construction details of the connection between an air conditioner outlet and a receptacle conduit.

As best shown in FIG. 6, the air conditioning outlet 16 has conventional, angularly adjustable louvers 63 disposed therein. Suitably connected by a snap-fit or the like to hose end 62 is an L-shaped fitting 64 which in turn is connected to the smaller end of inlet funnel 65. The larger end of funnel 65 is detachable secured to an adapter 66 having an aperture 67, a central rib 70 and a marginal edge portion 68 of resilient material, the latter defining a central bore 69. The edge portion 68 is arranged for flush engagement with the surface of dashboard 11 immediately adjacent to the outlet 16.

An adjustable fastening means is provided on the adapter 66 for securing the inlet hose assembly to dashboard outlet 16. More specifically, the adapter rib 70 is arranged to centrally support a screw 71 which threadedly engages an upturned tab 91 on the outer end of a hook 72. The other end of hook 72 engages a louver 63 to retain the funnel assembly in position. Rotation of screw 71 adjusts the compression of marginal portion 68 against the dashboard so as to maintain air sealing engagement around outlet 16. Upturned tab 91 prevents interference between the screw tip and the supporting louver.

The closure means or lid member 51 is provided with an air outlet 80 having an adjustable damper means for regulating the flow of air out of the container interior 27. The air outlet comprises a plurality of openings 73 arranged in suitably spaced relationship, 12 of such openings being provided in the preferred embodiment and arranged in two spaced-apart rows of six openings each. As shown in FIG. 2, the damper means includes a plate 73 arranged for sliding movement on the underside of the lid member 51. The plate 74 is provided with a plurality of openings 76 of the same number and arranged in the same spaced-apart relationship as the lid openings 73. The damper means is adjusted by means of an upstanding operating knob 77 suitably connected to the plate member 74 through an opening 78 in the lid member 51. The knob 77 is of an enlarged size so as to also serve as a handle for the lid 51 which may be moved between the container closed position of FIG. 1 and the container open position of FIG. 4. Thus, by manipulating the knob 77, the plate member 74 may be slidably moved between a fully open position where the slots 73 and 76 are aligned for full air flow from the container interior 27 and a fully closed position where the slots 73 and 76 are misaligned for completely sealing the container.

When the refrigerated air opening 58 in the lid member 51 is not in use, a removable cap means 81 is provided to seal the opening as shown in FIG. 4. The cap 81 is externally threaded for threaded engagement with the internal threads of opening 58.

The invention also includes a thermos-type liquid container or bottle 82 which may be of conventional insulated construction such as a vacuum thermos or the like for carrying a potable liquid or suitable beverage. The thermos 82 has a normally closed outlet or spigot 83, preferably of the conventional push-button type with a length of approximately 1 inch. The thermos may also be provided with a handle 84 for inserting and removing this auxiliary container from the chest interior 27. The thermos 82 is preferably arranged to lie horizontally upon the bottom wall 26 of the chest and may be of any desired size as will fit appropriately within interior 27. In the preferred embodiment, horizontally disposed bottle 82 is approximately 4½ inches wide, 9½ inches long and 5½ inches deep, a size which fits snugly within a chest of the aforementioned dimensions.

The side wall 22, which is on the passenger side when the chest is installed, is provided with an internally threaded opening 86. When the thermos bottle 82 is to be positioned within the chest interior 27, the thermos is inserted within the chest 18 in the direction indicated by the arrow B in FIG. 4. In the installed position, the thermos spigot 83 extends through the side wall opening 86 for ready access from the chest exterior without removal of lid 51. If ice is to be used in the chest with the thermos in position, the spigot 83 may be of a diameter and construction for sealing relationship with the edge of side wall opening 86. For example, a ring seal (not shown) may be threaded within opening 86 concentric to and in sealing engagement with spigot 83.

Figure 2:
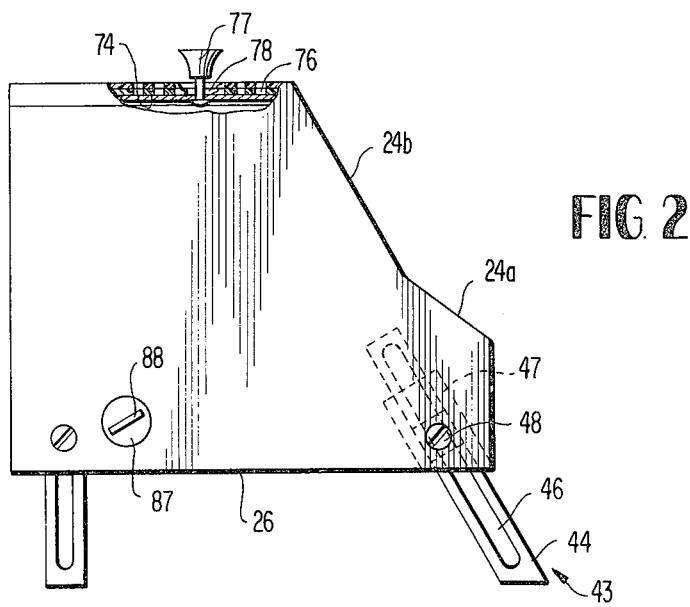
FIG. 2 is a fragmentary side elevational view of the invention.
Figure 3:
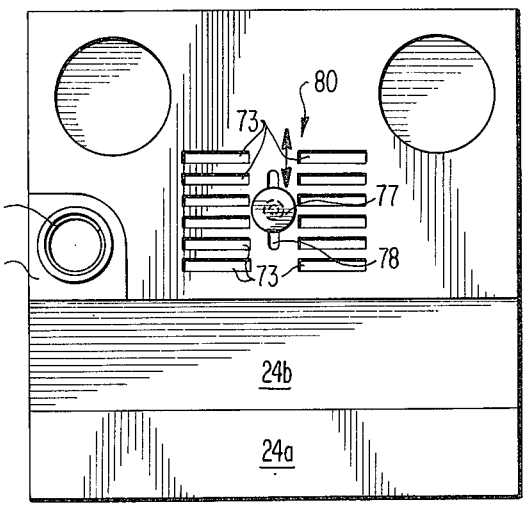
FIG. 3 is a plan view of the invention.

When the thermos bottle 82 is removed from the chest 18, a removable plug means is provided for closing the opening 86 and preferably comprises an externally threaded plug 87 having a screw-driver slot 88 for its manipulation into threaded engagement with the internal threads of opening 86 as shown best in FIG. 2.

Having thus described the invention, what is claimed is:

1. A combination cooler and receptacle for an automobile having a dashboard, a front seat, a transmission hum in underlying spaced relation to the central portion of said dashboard and an air conditioning unit with an outlet in said dashboard, which cooler and receptacle is comprised of:
   1. A container of insulating material having a front wall arranged to be installed adjacent to the front seat, an inclined rear wall arranged to be installed adjacent to the dashboard so as to extend forwardly underneath said dashboard in the space between the dashboard and said transmission hump, a pair of side walls, a botttom wall, and an open upper end, said walls being of a multi-layer construction with an inner layer of foam plastic material defining a watertight interior accessible through said open end and an outer supporting layer of substantially rigid plastic material and the outer layer of said bottom wall having an aperture adjacent to each side wall near said front wall and an aperture adjacent to each side wall near said rear wall;
   2. Closure means of insulating material arranged to be detachably positioned in snug-fitting, closing relationship with said container open end and including an upper surface having at least one downwardly depending recess formed integrally therein for accommodating a hand-sized vessel or the like, conduit means for introducing refrigerated air from said air conditioning outlet into said container interior, and air outlet means having an adjustable damper for regulating the flow of air out of said container;
   3. A pair of front leg members with one mounted on the inside of the rigid outer layer of each side wall between said inner and outer layers in spaced relation to said front bottom wall aperture and arranged for sliding movement through said aperture for vertical adjustment;
   4. A pair of rear leg members with one mounted on the inside of the rigid outer layer of each side wall between said inner and outer layers in spaced relation to said rear bottom wall aperture and arranged for sliding movement through said aperture for vertical adjustment, said rear leg members being angularly disposed for sliding movement substantially parallel to the incline of said wall; and,
   5. Clamping means operable from the exterior of said container for releasably securing said leg members in selected positions for vertical adjustment of said container.

2. A combination cooler and receptacle in accordance with claim 1 wherein said conduit means includes an inlet aperture in said container closure, a flexible hose, means for connecting one end of said hose to said inlet aperture and means for connecting the other end of said hose to said air conditioning outlet on the automobile dashboard.

3. A combination cooler and receptacle in accordance with claim 1 wherein said air outlet means includes a single upstanding operating knob for manually adjusting said damper to regulate outlet air flow, for manually moving said closure means into its snug-fitting closing relationship with said container open end, and for manually removing said closure means from said container open end for access to the container interior.

4. A combination cooler and receptacle in accordance with claim 1 wherein said air outlet means includes a plurality of openings arranged in spaced-apart relationship through said closure means and said adjustable damper is comprised of a plate member having a plurality of openings arranged in spaced-apart relationship corresponding to the spaced-apart relationship of said closure openings, means for mounting said plate member on the interior side of said closure means for sliding movement relative to said closure openings, sand means for slidably moving said plate member to adjustably position the plate openings between a fully open, aligned position and a fully closed, misaligned position relative to said closure openings.

5. A combination cooler and receptacle in accordance with claim 1 wherein one of said side walls in provided with an opening through both of said layers and an auxiliary elongated container of the liquid thermos type having a normally closed spigot extending from one end thereof is transversely disposed on its side within said container interior such that said spigot extends through said side wall opening for exterior access to the contents of said auxiliary container with said closure of the primary container in place.

6. A combination cooler and receptacle in accordance with claim 5 wherein seal means is provided concentric to said spigot within the inner layer portion of said opening for preventing any liquid in said watertight interior from leaking out between said wall opening and said extending spigot.

7. A combination cooler and receptacle in accordance with claim 2 wherein one of said side walls has an internally threaded drain opening and said cool air inlet aperture is internally threaded, and said cooler and receptacle includes removable cap means for engaging said air inlet threads to close said cool air inlet aperture and removable cap means for sealingly engaging said drain threads to close said side wall opening.

8. A combination cooler and receptacle in accordance with claim 1 wherein each of said leg members includes a stationary guide member secured to the container side wall; an extensible leg having a central, longitudinally extending groove therein, said leg being slidably mounted in said guide member; and a releasable clamping means having a clamping screw operable from the exterior of said container side wall, said clamping screw extending through said side wall and said central leg groove and being threadedly engageable with said guide member for clamping said leg to said guide member in a selected vertical position.

9. A combination cooler and receptacle for an automobile having a dashboard, a front seat, a transmission hump in underlying spaced relation to the central portion of said dashboard and an air conditioning unit with an outlet in said dashboard comprised of a container of insulating material having a front wall arranged to be installed adjacent to the front seat, an inclined rear wall arranged to be installed adjacent to the dashboard with at least a portion of said wall underlying said dashboard in the space between the dashboard and said transmission hump, a pair of side walls, a bottom wall, and an open upper end, said front and rear walls, said side walls, and said bottom wall defining an interior accessible through said open end; vertically adjustable leg means mounted on said container and arranged to support the container in overlying relationship with said transmission hump; and detachable closure means of insulating material including a substantially rectangular lid having a recessed marginal portion arranged along the lower edge of the sides thereof for snug-fitting, closing engagement with the inner edge portion of said container open end, conduit means for introducing refrigerated air from said air conditioning outlet into said container interior, an air outlet means having an adjustable damper for regulating the flow of air out of said container, and an upper surface having a pair of downwardly depending recesses formed integrally therein for accommodating hand-sized vessels or the like, said pair of recesses being disposed in space-apart relationship adjacent to the front side of said lid, said cool air aperture being disposed adjacent to the rear side of said lid, and said air outlet means being disposed centrally to said upper lid surface.

10. A combination cooler and receptacle for an automobile having a dashboard, a front seat, a transmission hump in underlying spaced relation to the central portion of said dashboard and an air conditioning unit with an outlet in said dashboard comprised of a container of insulating material having a front wall arranged to be installed adjacent to the front seat, an inclined rear wall arranged to be installed adjacent to the dashboard with at least a portion of said wall underlying said dashboard in the space between the dashboard and said transmission hump, a pair of side walls, a bottom wall and open upper end, said front and rear walls, said side walls, and said bottom wall defining an interior accessible through said open end; vertically adjustable leg means mounted on said container and arranged to support the container in overlying relationship with said transmission hump; closure means of insulating material arranged to be detachably position in snug-fitting, closing relationship with said container open end and including an upper surface having at least one downwardly depending recess formed integrally therein for accommodating a handsized vessel or the like, air outlet means having an adjustable damper for regulating the flow of air out of said container, and conduit means for introducing refrigerated air from said air conditioning outlet into said container interior including an inlet aperture in said container closure, a flexible hose, means for connecting one end of said hose to said inlet aperture, and means for connecting the other end of said hose to said air conditioning outlet comprising a hollow adapter having a margin of resilient material around one end, adjustable hook means on said adapter engageable with said outlet for mounting said adapter over said outlet with said resilient marginal portion in yieldable, sealing engagement with the dashboard surface adjacent to the edge of said outlet, a funnel arranged to be detachably mounted at its larger end to the other end of said adapter, an elbow fitting arranged to be detachably mounted on the smaller end of said funnel, and means for detachably mounting the other end of said hose to said elbow fitting.

* * * * *